US011125770B2

(12) United States Patent
Shannon et al.

(10) Patent No.: US 11,125,770 B2
(45) Date of Patent: Sep. 21, 2021

(54) ACOUSTIC AIR DATA SENSOR AND SYSTEM

(71) Applicant: Rosemount Aerospace Inc., Burnsville, MN (US)

(72) Inventors: Daniel W. Shannon, Glastonbury, CT (US); Brian Daniel Matheis, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 259 days.

(21) Appl. No.: 16/211,913

(22) Filed: Dec. 6, 2018

(65) Prior Publication Data

US 2021/0078722 A1    Mar. 18, 2021

(51) Int. Cl.
*G01P 13/02* (2006.01)
*G01P 5/24* (2006.01)

(52) U.S. Cl.
CPC ............ *G01P 13/025* (2013.01); *G01P 5/245* (2013.01)

(58) Field of Classification Search
CPC ........ G01P 13/025; G01P 5/245; B64D 43/02
See application file for complete search history.

(56) References Cited

U.S. PATENT DOCUMENTS

| 4,112,756 A | 9/1978 | MacLennan et al. |
| 4,336,606 A | 6/1982 | Heard |
| 5,025,661 A * | 6/1991 | McCormack ....... G01L 19/0007 73/180 |
| 5,461,931 A * | 10/1995 | Gill .......................... G01F 1/662 73/861.27 |
| 5,585,557 A * | 12/1996 | Loschke ................... G01P 5/14 73/170.14 |

(Continued)

FOREIGN PATENT DOCUMENTS

WO    WO 9635927 A1    11/1996

OTHER PUBLICATIONS

Xiaoliang Jiao et al: "Predictor-Corrector Method for Scramjet Inlet Air Mass Flow Rate Measuremnt," AIAA Journal, vol. 55, No. 7, Jul. 1, 2017, pp. 2382-2394, XP055687468, US ISSN: 0001-1452, DOI: 10.2514/1.J055831.

(Continued)

*Primary Examiner* — Xin Y Zhong
(74) *Attorney, Agent, or Firm* — Kinney & Lange, P.A.

(57) ABSTRACT

An acoustic air data sensor for an aircraft includes an acoustic transmitter, an acoustic receiver, an acoustic signal generator, timing circuitry, speed of sound determination circuity, and communication circuitry. The acoustic transmitter is located to transmit an acoustic signal through an airflow stagnation chamber that is pneumatically connected to an exterior of the aircraft and configured to receive and stagnate airflow from the exterior of the aircraft. The acoustic receiver is positioned at a distance from the acoustic transmitter to receive the acoustic signal. The pulse generator causes the acoustic transmitter to provide the acoustic signal. The timing circuitry determines a time of flight of the acoustic signal from the acoustic transmitter to the acoustic receiver. The speed of sound determination circuity determines, based on the time of flight and the distance, a speed of sound through air in the stagnation chamber. The communication circuitry outputs the speed of sound.

20 Claims, 3 Drawing Sheets

(56) References Cited

U.S. PATENT DOCUMENTS

| 5,918,281 | A | * | 6/1999 | Nabulsi | G01F 1/10 |
| | | | | | 73/597 |
| 7,328,624 | B2 | | 2/2008 | Gysling et al. | |
| 7,490,510 | B2 | | 2/2009 | Agami et al. | |
| 2010/0021310 | A1 | | 1/2010 | Clemen | |
| 2016/0161525 | A1 | | 6/2016 | Evans et al. | |

OTHER PUBLICATIONS

Extended European Search Report for European Patent Application No. 19214174.5, dated May 4, 2020, ten pages.

* cited by examiner

ACOUSTIC AIR DATA SENSOR AND SYSTEM

BACKGROUND

This disclosure relates generally to acoustic air data sensors, and more particularly to acoustic air data sensors that measure a speed of sound in air.

Modern aircraft often incorporate air data systems that calculate air data outputs based on measured parameters collected from various sensors positioned about the aircraft. For instance, many air data systems utilize air data probes that measure parameters of oncoming airflow about the aircraft exterior to generate aircraft air data outputs, such as angle of attack (i.e., an angle between the oncoming airflow or relative wind and a reference line of the aircraft, such as a chord of a wing of the aircraft), calibrated airspeed, Mach number, altitude, or other air data parameters.

Many of the calculated air data outputs vary as a function of the speed of sound through the air about the aircraft exterior. Often, the speed of sound is inferentially determined based on measured parameters, such as a total air temperature of the exterior air. Such inferential determinations of the speed of sound, however, can result in lower accuracy of the air data parameter outputs.

SUMMARY

In one example, an acoustic air data sensor for an aircraft includes an acoustic transmitter, an acoustic receiver, an acoustic signal generator, timing circuitry, speed of sound determination circuity, and communication circuitry. The acoustic transmitter is located to transmit an acoustic signal through an airflow stagnation chamber that is pneumatically connected to an exterior of the aircraft and configured to receive and stagnate airflow from the exterior of the aircraft. The acoustic receiver is positioned at a distance from the acoustic transmitter to receive the acoustic signal transmitted by the acoustic transmitter through the airflow stagnation chamber. The acoustic signal generator causes the acoustic transmitter to provide the acoustic signal. The timing circuitry determines a time of flight of the acoustic signal from the acoustic transmitter to the acoustic receiver. The speed of sound determination circuity determines, based on the time of flight and the distance, a speed of sound through air in the stagnation chamber. The communication circuitry outputs the speed of sound.

In another example, an air data system for an aircraft includes an acoustic air data sensor, an air data sensor, and an air data computer. The acoustic air data sensor includes an acoustic transmitter, an acoustic receiver, an acoustic signal generator, timing circuitry, speed of sound determination circuity, and communication circuitry. The acoustic transmitter is located to transmit an acoustic signal through an airflow stagnation chamber that is pneumatically connected to an exterior of the aircraft and configured to receive and stagnate airflow from the exterior of the aircraft. The acoustic receiver is positioned at a distance from the acoustic transmitter to receive the acoustic signal transmitted by the acoustic transmitter through the airflow stagnation chamber. The acoustic signal generator causes the acoustic transmitter to provide the acoustic signal. The timing circuitry determines a time of flight of the acoustic signal from the acoustic transmitter to the acoustic receiver. The speed of sound determination circuity determines, based on the time of flight and the distance, a speed of sound through air in the stagnation chamber. The communication circuitry outputs the speed of sound. The air data sensor is mounted to the exterior of the aircraft and produces air data measurements. The air data computer is configured to receive the speed of sound from the acoustic air data sensor, receive the air data measurements from the air data sensor, and determine one or more air data output parameters using the received speed of sound from the acoustic air data sensor and the received air data measurements from the air data sensor.

DETAILED DESCRIPTION

According to techniques of this disclosure, an air data system includes an acoustic air data sensor that measures the speed of sound through air within an airflow stagnation chamber that is pneumatically connected to an exterior of the aircraft. That is, rather than measure parameters related to the speed of sound and inferentially determining the speed of sound for use with air data output calculations, the air data system described herein directly measures the speed of sound through air about the exterior of the aircraft, thereby increasing accuracy of the speed of sound determinations and providing direct measurement results for use with, e.g., air data parameter calculations and/or system calibration and configuration operations.

As described herein, airflow about the aircraft exterior is directed to the stagnation chamber, which is configured to receive and stagnate the airflow. The acoustic air data sensor includes an acoustic transmitter and an acoustic receiver. The acoustic transmitter provides an acoustic signal through the stagnation chamber, which is received by the acoustic receiver. Air within the stagnation chamber has, via the pneumatic connection to the aircraft exterior, similar properties to the exterior air, such as with respect to temperature and relative humidity. Stagnated air (i.e., substantially unmoving air) within the stagnation chamber, however, does not impart directional airflow effects that could impact the acoustic signal as it travels between the acoustic transmitter and the acoustic receiver.

The acoustic air data sensor described herein determines the speed of sound through the air in the stagnation chamber (and hence through the pneumatically-connected air about the aircraft exterior) based on a time of flight of the acoustic signal from the acoustic transmitter to the acoustic receiver, such as by dividing a known distance between the acoustic transmitter and the acoustic receiver by the determined time of flight of the acoustic signal. In some examples, the acoustic air data sensor utilizes the determined speed of sound to produce a temperature measurement of the air within the stagnation chamber. The speed of sound and/or air temperature measurements are output to, e.g., an air data computer that utilizes one or more of the measurements for air data output parameter calculations and/or system configuration and calibration operations.

Figure 1:
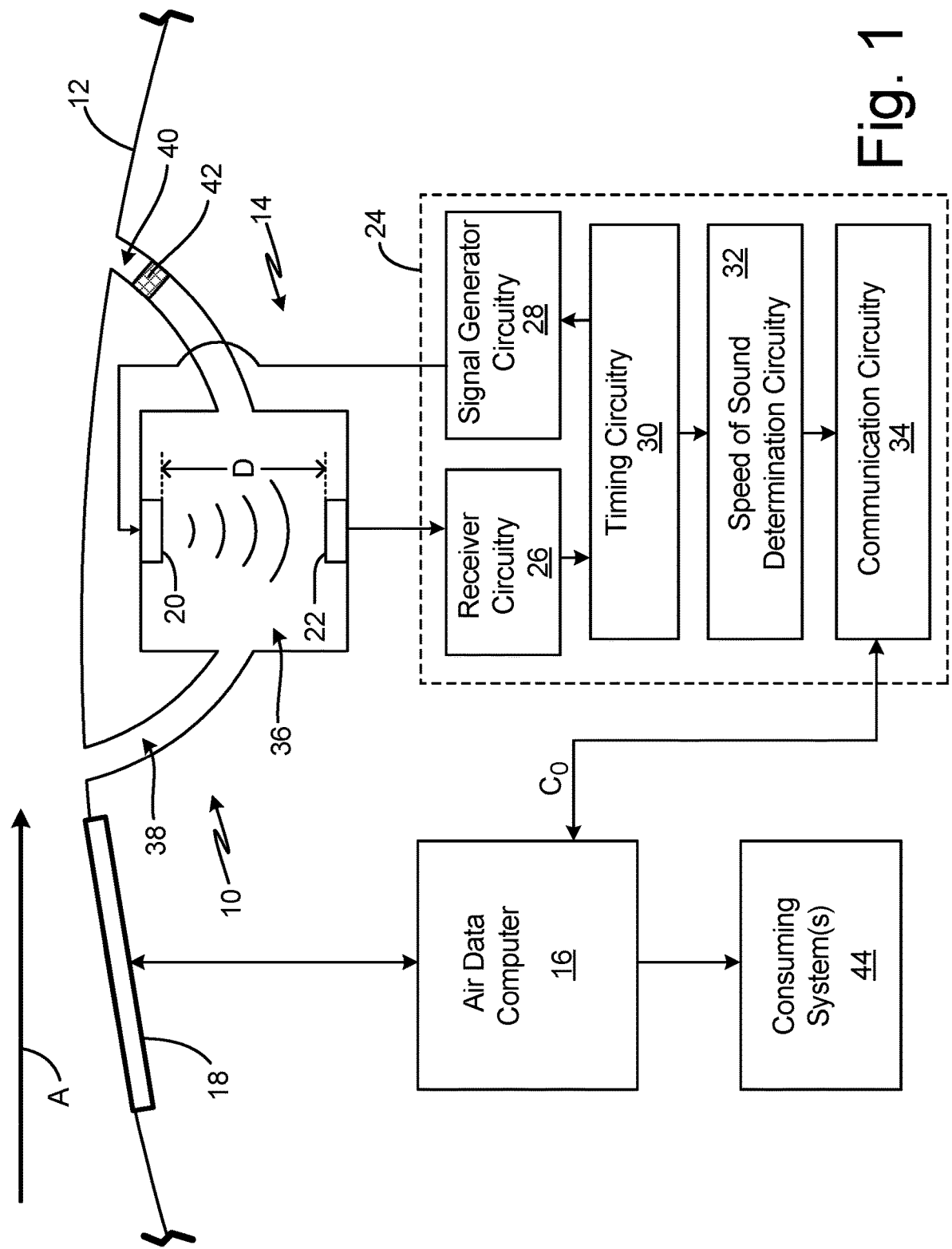
FIG. 1 is a schematic diagram of one example of an aircraft air data system that includes an air data computer, an acoustic anemometer, and an acoustic air data sensor that outputs a speed of sound measurement.

FIG. 1 is a schematic diagram of one example of air data system 10 of aircraft 12 including acoustic air data sensor 14 that outputs a speed of sound measurement $C_O$, air data computer 16, and acoustic anemometer 18. That is, in the example of FIG. 1, air data system 10 utilizes speed of sound measurement $C_O$ received from acoustic air data sensor 14 for air data operations associated with acoustic measurements received from acoustic anemometer 18. In other examples, such as the example of FIG. 3, air data system 10 utilizes one or more of speed of sound measurement $C_O$ and an air temperature (T) measurement received from acoustic air data sensor 14 for air data operations associated with measurements received from, e.g., a pressure-based or other air data sensor, as is further described below. In yet other examples, air data system 10 utilizes both speed of sound measurement $C_O$ and the temperature measurement received from acoustic air data sensor 14 for air data operations associated with measurements received from both acoustic anemometer 18 and a pressure-based or other air data sensor mounted to an exterior of aircraft 12.

As illustrated in FIG. 1, acoustic air data sensor 14 includes acoustic transmitter 20, acoustic receiver 22, and acoustic air data sensor controller 24. Acoustic air data sensor controller 24 includes receiver circuitry 26, acoustic signal generator circuitry 28, timing circuitry 30, speed of sound determination circuitry 32, and communication circuitry 34. Acoustic transmitter 20 is located to transmit an acoustic signal through stagnation chamber 36. Acoustic receiver 22 is located at a known distance D from acoustic transmitter 22 to receive the acoustic signal after transmission through distance D of stagnation chamber 36. The acoustic signal transmitted by acoustic transmitter 20 and received by acoustic receiver 22 can take the form of an acoustic pulse, and oscillating acoustic signal, a broadband acoustic signal, a random source acoustic signal, or other form of acoustic signal. Though in the example of FIG. 1, acoustic transmitter 20 and acoustic receiver 22 are illustrated as located within stagnation chamber 36, in other examples, any one or more of acoustic transmitter 20 and acoustic receiver 22 can be located outside of stagnation chamber 36, such as adjacent a wall of stagnation chamber 36 to transmit and/or receive the acoustic signal.

Stagnation chamber 36, in the example of FIG. 1, is located within an interior of aircraft 12 and is pneumatically connected to an airflow about an exterior of aircraft 12 via inlet 38 and outlet 40. In operation, air passes over the exterior of aircraft 12 in direction A during, e.g., forward flight of aircraft 12. A portion of the airflow over the exterior of aircraft 12 is directed to stagnation chamber 36 through inlet 38. Stagnation chamber 36, in the example of FIG. 1, is a chamber formed within the interior of aircraft 12 (i.e., under the aircraft skin) and configured to stagnate airflow received via inlet 38 and exiting via outlet 40. That is, inlet 38 and outlet 40 can be pneumatic tubes, orifices, or other pneumatic connections between stagnation chamber 36 and the exterior of aircraft 12 that are sized relative to stagnation chamber 36 to cause stagnation of airflow within stagnation chamber 36 prior to exiting outlet 40. For instance, inlet 38 and outlet 40 can have a maximum width that is less than a maximum width of stagnation chamber 36, such as a maximum width of inlet 38 and outlet 40 that is less than ten percent, five percent, or other percentages of a maximum width of stagnation chamber 36. Stagnation chamber 36 can therefore be configured to cause stagnation of air within chamber 36, such that a velocity of airflow in a direction from acoustic transmitter 20 to acoustic receiver 22 is less than, e.g., two percent of a velocity of airflow about the exterior of aircraft 12.

To decrease a velocity of airflow through inlet 38, stagnation chamber 36, and outlet 40 (thereby increasing stagnation of airflow within stagnation chamber 36), one or more of inlet 38 and outlet 40 can include a flow restrictor. For instance, as in the example of FIG. 1, outlet 40 can include flow restrictor 42, which can be a porous flow restrictor or other type of flow restrictor configured to decrease airflow through outlet 40. The porous flow restrictor can be, for example, an insert or integrally-formed portion of outlet 40 having a plurality of orifices configured to decrease an open cross-sectional area of outlet 40. In other examples, flow restrictor 42 can be located within inlet 38, or within both inlet 38 and outlet 40. In some examples, flow restrictor 42 can take the form of a narrowing of inlet 38 and/or outlet 40 configured to decrease airflow through inlet 38 and/or outlet 40 (and hence stagnation chamber 36).

While stagnation chamber 36 is illustrated and described herein as a chamber formed within an interior of aircraft 12, it should be understood that aspects of this disclosure are not so limited. For instance, in other examples, stagnation chamber 36 can be located within and/or can be considered a portion of an existing area of stagnation (i.e., low airflow) of aircraft 12, such as within existing cavities of aircraft 12 (e.g., a wheel well, under wing flaps, or other cavities), locations of separated wakes of aircraft 12, or other locations of aircraft 12 having low flow velocity (e.g., less than two percent of a velocity of airflow about the exterior of aircraft 12).

As illustrated in FIG. 1, acoustic signal generator circuitry 28 of acoustic air data sensor controller 24 is electrically coupled with acoustic transmitter 20 of acoustic air data sensor 14. Receiver circuitry 26 is electrically coupled with acoustic receiver 22 of acoustic air data sensor 14. Acoustic air data sensor 14 is electrically and/or communicatively coupled with air data computer 16 to send and receive data (e.g., speed of sound $C_O$) using communication circuitry 34 via, e.g., a wired or wireless communication interface, or both. Air data computer 16 is electrically and/or communicatively coupled with acoustic anemometer 18 and one or more consuming systems 44.

Acoustic air data sensor 14 includes acoustic transmitter 20, acoustic receiver 22, and acoustic air data sensor controller 24. Acoustic transmitter 20 can be a piezoelectric speaker, a cone speaker, a microelectro-mechanical systems (MEMS) speaker, or other electric-to-acoustic transducer capable of producing an acoustic signal (e.g., an acoustic pulse, an oscillating acoustic signal, a broadband acoustic signal, a random source acoustic signal, or other type of acoustic signal). Acoustic receiver 22 can be a microphone, such as a MEMS microphone, a condenser microphone, or other acoustic-to-electric transducer. Acoustic air data sensor controller 24, including receiver circuitry 26, acoustic signal generator circuitry 28, timing circuitry 30, speed of sound determination circuitry 32, and communication circuitry 34 can be enclosed within a housing and electrically coupled with acoustic transmitter 20 and acoustic receiver 22.

As illustrated in FIG. 1, receiver circuitry 26 is electrically coupled with acoustic receiver 22 to receive an indication (e.g., voltage, current, or other indication) of acoustic signals received by acoustic receiver 22. Acoustic signal generator circuitry 28 is electrically coupled with acoustic transmitter 20 to cause acoustic transmitter 20 to produce an acoustic signal. Timing circuitry 30 is electrically coupled with receiver circuitry 26 and acoustic signal generator circuitry 28 to control acoustic signal generator circuitry 28 to cause acoustic transmitter 20 to provide an acoustic signal at a first time and to receive an indication of the acoustic signal received by acoustic receiver 22 at a second time after transmission of the acoustic signal through stagnation chamber 36. Timing circuitry 30 determines a time of flight of the acoustic signal from acoustic transmitter 20 to acoustic receiver 22 as a difference between the first time when the acoustic signal is transmitted by acoustic transmitter 20 and the second time when the acoustic signal is received by acoustic receiver 22.

Speed of sound determination circuitry 32 is electrically coupled with timing circuitry 30 to receive an indication of the time of flight of the acoustic signal from acoustic transmitter 20 to acoustic receiver 22. Speed of sound determination circuitry 32 determines a speed of sound through air in the stagnation chamber based on the time of flight of the acoustic signal received from timing circuitry 30 and the known distance D between acoustic transmitter 20 and acoustic receiver 22. For instance, speed of sound determination circuitry 32 can determine the speed of sound by dividing the known distance D between acoustic transmitter 20 and acoustic receiver 22 by the time of flight of the acoustic signal between acoustic transmitter 20 and acoustic receiver 22.

In some examples, speed of sound determination circuitry 32 determines the speed of sound based on a mean, a median, a mode, or other central tendency of a plurality of speed of sound determinations. For instance, timing circuitry 30 can cause acoustic signal generator circuitry 28 to transmit a plurality of acoustic signals at a plurality of times, such as at a frequency of 0.1 Hertz (Hz), 0.5 Hz, 1 Hz, 5 Hz, or other regular or irregular frequencies. Timing circuitry 30 can provide an indication of the time of flight of each of the plurality of acoustic signals to speed of sound determination circuitry 32. Speed of sound determination circuitry 32 can determine the speed of sound for each of the plurality of acoustic signals, and can determine the speed of sound through air in the stagnation chamber (and hence through air around the exterior of the aircraft via the pneumatic connection to the exterior air) based on a central tendency of the plurality of speed of sound determinations.

Communication circuitry 34 is electrically connected to speed of sound determination circuitry 32 to receive the speed of sound measurement. Communication circuitry 34 outputs speed of sound measurement $C_0$, such as to air data computer 16. Communication circuitry 34 can take the form of a wired or wireless communications interface, such as a network interface card, a radio frequency transceiver, or other type of circuitry configured to send (and, in some examples, receive) information via a communication protocol, such as the Aeronautical Radio, Incorporated (ARINC) 429 communication protocol, controller area network (CAN) bus communication protocol, military standard 1553 (MIL-STD-1553) communication protocol, Bluetooth protocol, or any other wired or wireless analog or digital communication protocol.

While the example of FIG. 1 is described above with respect to receiver circuitry 26, acoustic signal generator circuitry 28, timing circuitry 30, speed of sound determination circuitry 32, and communication circuitry 34, it should be understood that functionality attributed herein to acoustic air data sensor controller 24 can be performed in hardware, software, or combinations of hardware and software. For instance, acoustic air data sensor controller 24 can include one or more processors and computer-readable memory encoded with instructions that, when executed by the one or more processors, cause acoustic air data sensor controller 24 to operate in accordance with techniques described herein.

Examples of one or more processors can include any one or more of a microprocessor, a digital signal processor (DSP), an application specific integrated circuit (ASIC), a field-programmable gate array (FPGA), or other equivalent discrete or integrated logic circuitry. Computer-readable memory can include volatile memory, such as random access memories (RAM), dynamic random access memories (DRAM), static random access memories (SRAM), and other forms of volatile memory. Computer-readable memory can also include non-volatile memory, such as magnetic hard discs, optical discs, floppy discs, flash memories, or forms of electrically programmable memories (EPROM) or electrically erasable and programmable (EEPROM) memories. In some examples, the computer-readable memory can include a non-transitory medium. The term "non-transitory" can indicate that the storage medium is not embodied in a carrier wave or a propagated signal. In certain examples, a non-transitory storage medium can store data that can, over time, change (e.g., in RAM or cache).

Figure 2:
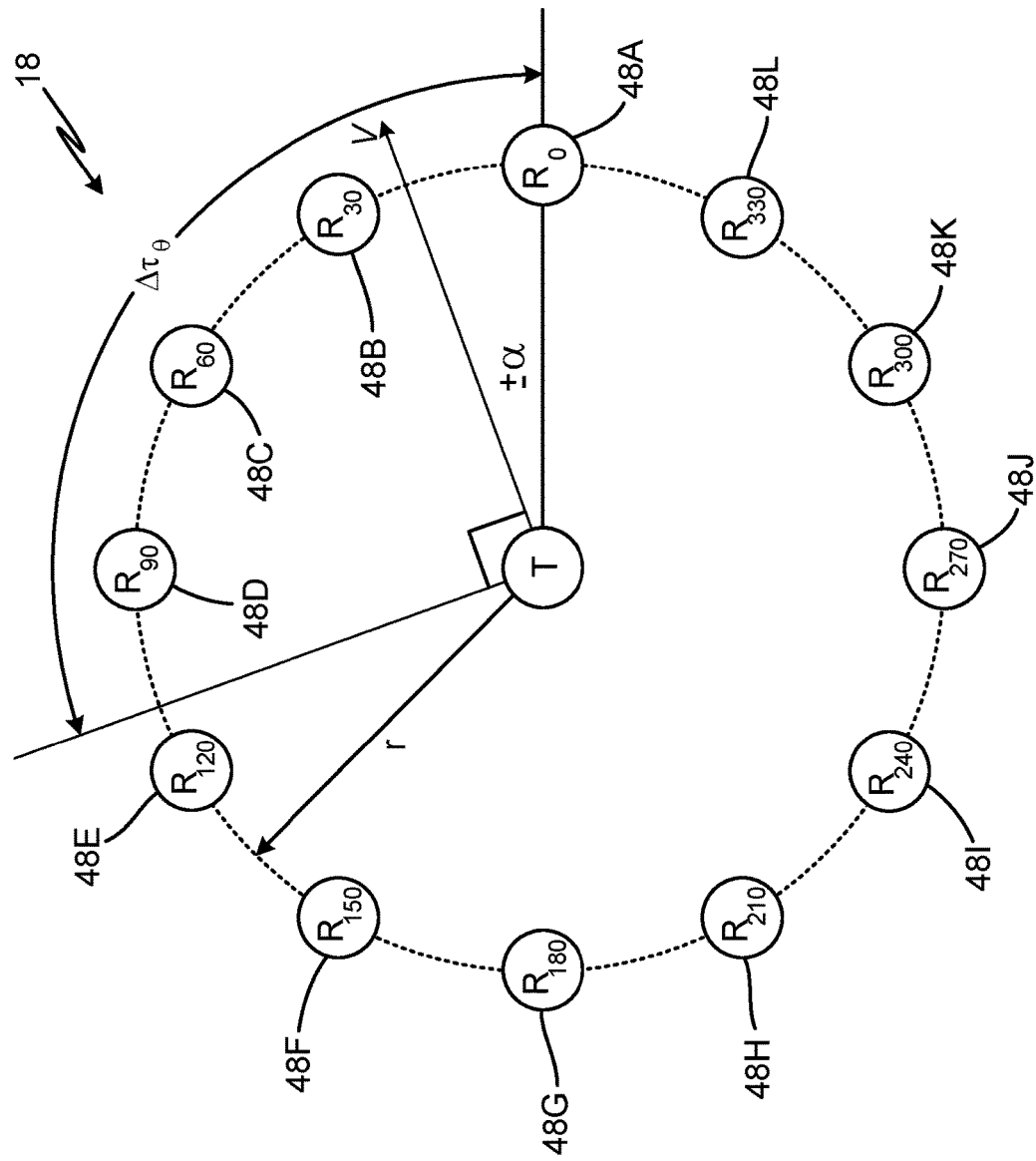
FIG. 2 is a top-down view of the acoustic anemometer of FIG. 1.

As illustrated in FIG. 1, air data computer 16 receives speed of sound measurement $C_0$ from acoustic air data sensor controller 24. Air data computer 16 utilizes the received speed of sound measurement $C_0$ for, e.g., air data parameter output calculations and/or system calibration and configuration operations. For instance, as is further described below, and as illustrated in FIG. 2, acoustic anemometer 18 can be an acoustic sensor, mounted to an exterior of aircraft 12, that includes an acoustic transmitter and a plurality of acoustic receivers arranged to receive an acoustic pulse emitted by the acoustic transmitter. For instance, acoustic anemometer 18 can be an acoustic angle-of-attack sensor as described in currently co-pending application Ser. No. 15/934,584, entitled "ACOUSTIC ANGLE-OF-ATTACK SENSOR," filed on Mar. 23, 2018, the entire contents of which are hereby incorporated by reference.

The plurality of acoustic receivers of acoustic anemometer 18 receive, at varying times, the acoustic pulse emitted by the acoustic transmitter of acoustic anemometer 18. The time delay between transmission of the acoustic pulse by the acoustic transmitter and reception by the plurality of acoustic receivers is dependent upon the velocity of exterior airflow over acoustic anemometer 18, the angle of attack of the local exterior airflow, and the speed of sound through the local exterior air. Acoustic anemometer 18 can transmit, to air data computer 16, the time-of-flight between transmission of an acoustic pulse from the acoustic transmitter of acoustic anemometer 18 and reception of the acoustic pulse by the plurality of acoustic receivers of acoustic anemometer 18. Air data computer 16 can determine one or more air data parameter outputs, such as angle of attack of the airflow, velocity of the airflow (e.g., airspeed), or other air data parameter outputs based on the plurality of time-of-flight measurements received from acoustic anemometer 18 and speed of sound measurement $C_0$ received from acoustic air data sensor controller 24, as is further described below.

In some examples, air data computer 16 utilizes speed of sound measurement $C_0$ received from acoustic air data sensor controller 24 for calibration and/or configuration operations associated with measurements received from acoustic anemometer 18. For instance, because acoustic propagation of sound waves traveling between the acoustic transmitter of acoustic anemometer 18 and the acoustic receivers of acoustic anemometer 18 is impacted by flow-induced effects of the airflow about the exterior of aircraft 12, air data computer 16 can utilize the speed of sound measurement $C_0$ received from acoustic air data sensor controller 24 for calibration and/or configuration operations associated with acoustic anemometer 18, rather than determine a speed of sound through the external air using the time-of-flight of acoustic pulses between the acoustic transmitter of acoustic anemometer 18 and the acoustic receivers of acoustic anemometer 18. Calibration and/or configuration operations can include, but are not limited to, a weighting or other contribution of signals from certain of the acoustic receivers of acoustic anemometer 18, a selection of certain of the acoustic receivers of acoustic anemometer 18 for use in air data computations, or other calibration and/or configuration operations.

Air data computer 16 transmits the determined air data output parameters to one or more consuming systems 44, which utilize the air data output parameters for operational control of aircraft 12, such as flight planning, flight control, cabin pressurization, or other control operations. Consuming systems 44 can include, e.g., aircraft avionics systems, flight management systems, cabin pressurization systems, flight display systems such as electronic flight instrument systems (EFIS), or other consuming systems of air data parameters.

Accordingly, air data system 10, including acoustic air data sensor 14 implementing techniques of this disclosure, can directly measure a speed of sound of air around an exterior of aircraft 12. Techniques of this disclosure can thereby increase an accuracy of air data parameter outputs used for operational control of aircraft 12.

FIG. 2 is a top-down view of acoustic anemometer 18. As illustrated in FIG. 2, acoustic anemometer 18 includes acoustic transmitter 46 and acoustic receivers 48A-48L. Acoustic receivers 48A-48L, in the example of FIG. 2, are located at fixed radius (r) at thirty-degree intervals around acoustic transmitter 46, though other numbers of acoustic receivers (greater than or less than the twelve acoustic receivers of FIG. 2) and other angular intervals of location (greater than or less than the thirty degree intervals of FIG. 2) are possible.

In the example of FIG. 2, airflow over acoustic anemometer 18 has velocity V at angle of attack α. The time-of-flight (τ) of an acoustic pulse emitted by acoustic transmitter 46 can be measured to each of acoustic receivers 48A-48L. The time-of-flight of the acoustic pulse from acoustic transmitter (T) 46 to each of acoustic receivers ($R_\theta$) 48A-48L placed at angle θ is given by:

$$\tau_\theta = \frac{r}{C_0 + |V| \cos(\theta - \alpha)} \quad \text{(Equation 1)}$$

where $C_0$ is the speed of sound in the external airflow, α is the angle-of-attack, and V is the airspeed of airflow.

As shown in Equation 1, time-of-flight (τ) is impacted by the airspeed, the angle-of-attack, and the speed of sound. The radius is constant because acoustic receivers 48A-48L are positioned at fixed radius and angular intervals with respect to acoustic transmitter 46. Air data computer 16 (FIG. 1) can therefore utilize the speed of sound measurement $C_0$ received from acoustic air data sensor 14 (FIG. 1) for use in determining an angle of attack of the airflow using Equation 1 above. For instance, air data computer 16 can receive an indication of airspeed, such as from a pitot-static sensor (not illustrated) of aircraft 12 (FIG. 1), and can solve for angle of attack α using Equation 1. In other examples, air data computer 16 can receive an indication of angle of attack of the airflow, such as from an angle of attack vane (not illustrated) of aircraft 12, and can solve for the airspeed V using Equation 1.

Accordingly, air data computer 16 can utilize time-of-flight information received from acoustic anemometer 18 and speed of sound measurement $C_0$ received from acoustic air data sensor 14 to determine air data parameter outputs. In some examples, a correction and/or calibration can be applied to speed of sound measurement $C_0$ received from acoustic air data sensor 14 to correlate the speed of sound measurement $C_0$ within stagnation chamber 36 with the speed of sound of the external airflow across acoustic anemometer 18. The use of speed of sound measurement $C_0$ received from acoustic air data sensor 14, which is decoupled from flow-induced effects over the surface of acoustic anemometer 18, can increase accuracy of the air data parameter outputs, thereby enhancing the usability of the air data parameter outputs for operational control of aircraft 12.

Figure 3:
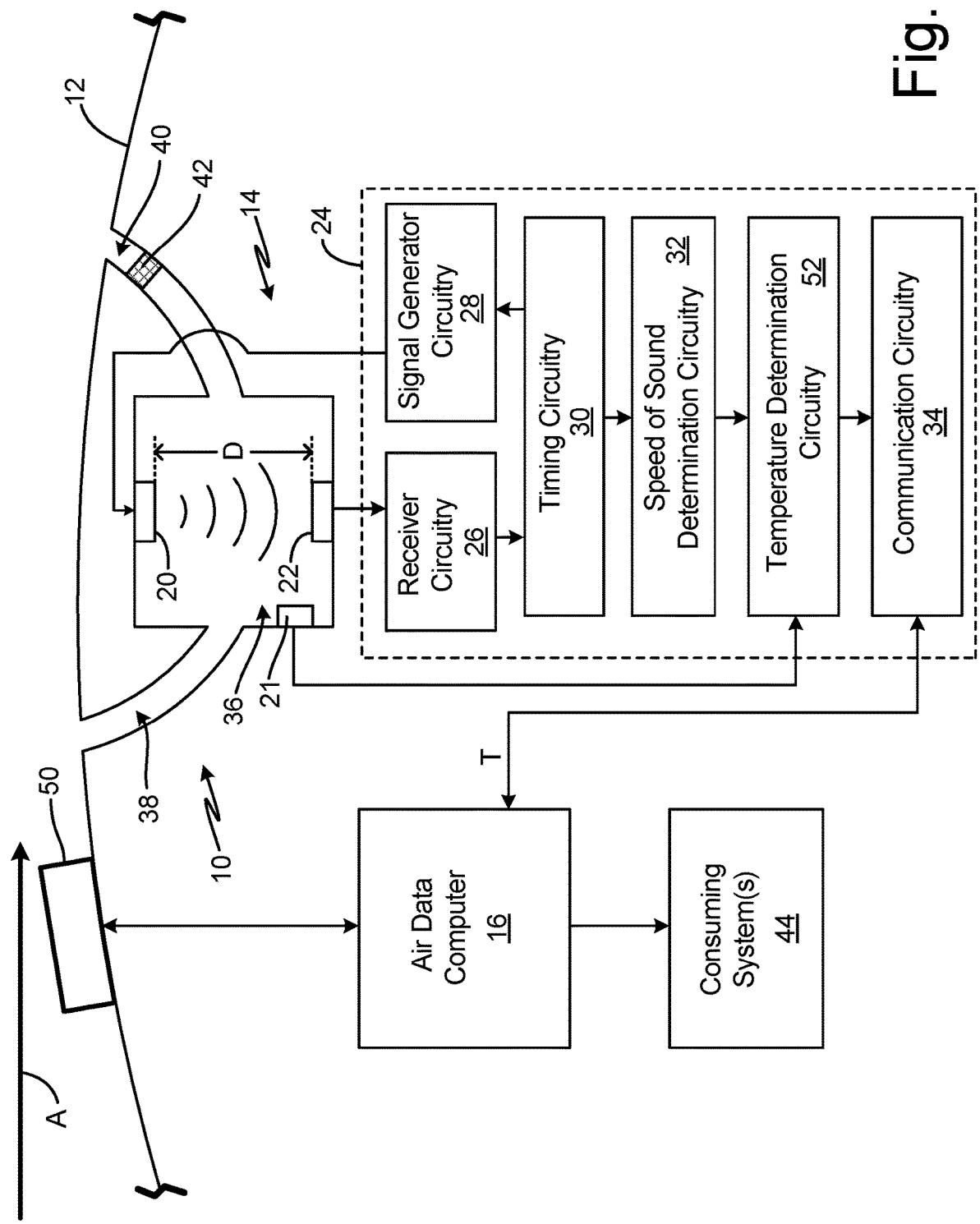
FIG. 3 is a schematic diagram of another example of the aircraft air data system of FIG. 1 including an acoustic air data sensor that outputs an air temperature measurement.

FIG. 3 is a schematic diagram of another example of air data system 10 of FIG. 1 including acoustic air data sensor 14 that outputs an air temperature (T) measurement, air data computer 16, and air data sensor 50. That is, the example of FIG. 3 illustrates another embodiment of air data system 10 in which air data sensor 14 determines and outputs a TAT measurement for use by air data computer 16. The example of FIG. 3 is therefore substantially similar to the example of FIG. 1, and like numerals are utilized to reference like components.

As illustrated in FIG. 3, acoustic air data sensor controller 24 can also include temperature determination circuitry 52 and humidity sensor 21. Humidity sensor 21 is a capacitive, resistive, thermal, or other type of humidity sensor that measures a relative humidity or other indication of an amount of water vapor in air. Humidity sensor 21, as illustrated in FIG. 3, can be located within stagnation chamber 36 to sense a relative humidity or other indication of an amount of water vapor present within the air in stagnation chamber 36. Humidity sensor 21 is electrically connected with temperature determination circuitry 52 to provide an indication of the sensed humidity of air within stagnation chamber 36.

Temperature determination circuitry 52 is electrically connected to speed of sound determination circuitry 32 to receive the speed of sound measurement. Temperature determination circuitry 52 is configured to determine a temperature (T) of the air within the stagnation chamber 36 (and hence the exterior air about aircraft 12 via the pneumatic connection to the aircraft exterior). For example, the speed of sound through air is known to vary proportionally to the square root of the temperature of the air according to the following equation:

$$C_0 = \sqrt{\frac{\gamma RT}{M}} \quad \text{(Equation 2)}$$

where $C_0$ is the speed of sound in air, γ is the adiabatic constant of the air within stagnation chamber 36, R is the universal gas constant (8.314 J/mol K), T is the absolute temperature of the air within stagnation chamber 36, and M is molecular mass of the air within stagnation chamber 36. As such, solving Equation 2 for the temperature T, the temperature T can be expressed according to the following equation:

$$T = \frac{MC_0^2}{\gamma R} \quad \text{(Equation 3)}$$

where T is the total air temperature (TAT) of the air in the stagnation chamber, M is the molecular mass of the air within stagnation chamber 36, $C_0$ is the speed of sound measurement received from speed of sound determination circuitry 32, γ is the adiabatic constant of the air within stagnation chamber 36, and R is the universal gas constant (8.314 J/mol K).

The molecular mass of air M and the adiabatic constant of air γ are known to vary as a function of the amount of water vapor present in the air (e.g., relative humidity). As such, in some examples, such as when acoustic air data sensor 14 does not include humidity sensor 21, temperature determination circuitry 52 can determine the temperature T using known values of the molecular mass M and the adiabatic constant γ for, e.g., dry air (i.e., a molecular mass M of 28.95 gm/mol and an adiabatic constant γ of 1.4).

In other examples, such as the example of FIG. 3 in which acoustic air data sensor 14 includes humidity sensor 21, temperature determination circuitry 52 can calculate the values of the molecular mass of air M and the adiabatic constant of the air γ using the indication of the amount of water vapor present in the air within stagnation chamber 36 (e.g., relative humidity) received from humidity sensor 21, as is known in the art. As such, temperature determination circuitry 52, using an indication of the amount of water vapor present in the air within stagnation chamber 36 received from humidity sensor 21, can increase an accuracy of the determined temperature T via the calculated values of the molecular mass of air M and the adiabatic constant of the air γ.

Temperature determination circuitry 52, as illustrated in FIG. 3, is electrically connected with communication circuitry 34 to output the air temperature (T) of air within stagnation chamber 36 to air data computer 16. Air data computer 16 utilizes the temperature measurement T received from acoustic air data sensor 14 for air data parameter output determinations, such as in combination with a pressure or other air data measurement received from air data sensor 50 mounted to the exterior of aircraft 12. For instance, air data sensor 50 can be a static pressure sensor, a pitot pressure sensor, a pitot-static pressure sensor, or other air data sensing probe mounted to the exterior of aircraft 12 and configured to measure one or more parameters of the airflow about the exterior of aircraft 12. Air data computer 16 can utilize the temperature measurement T received from acoustic air data sensor 14 in combination with, e.g., pressure measurements received from air data sensor 50 to determine air data parameters, such as static air temperature (SAT), true airspeed (TAS), or other air data parameter outputs. Air data computer 16 provides the determined air data parameter outputs to consuming systems 44 for operational control of aircraft 12.

As such, air data system 10, including acoustic air data sensor 14 implementing techniques of this disclosure, can directly measure a speed of sound of air around an exterior of aircraft 12. Acoustic air data sensor 14 can utilize the direct measurement of the speed of sound to determine a temperature of air within stagnation chamber 36, which is pneumatically connected to the air about the exterior of aircraft 12. Accordingly, acoustic air data sensor 14 can, in certain examples, enable an air data computer to determine air data parameter outputs that are dependent upon a total air temperature (TAT) measurement without requiring a separate temperature probe (e.g., a traditional TAT probe) for measuring the total air temperature. In certain examples, acoustic air data sensor 14 can provide a TAT measurement to, e.g., air data computer 16 for use as a redundant cross-check for a TAT measurement received from a separate temperature probe (e.g., a traditional TAT probe) to provide redundancy and comparison of data, thereby increasing robustness of operation of the air data system.

Discussion of Possible Embodiments

The following are non-exclusive descriptions of possible embodiments of the present invention.

An acoustic air data sensor for an aircraft includes an acoustic transmitter, an acoustic receiver, an acoustic signal generator, timing circuitry, speed of sound determination circuity, and communication circuitry. The acoustic transmitter is located to transmit an acoustic signal through an airflow stagnation chamber that is pneumatically connected to an exterior of the aircraft and configured to receive and stagnate airflow from the exterior of the aircraft. The acoustic receiver is positioned at a distance from the acoustic transmitter to receive the acoustic signal transmitted by the acoustic transmitter through the airflow stagnation chamber. The acoustic signal generator causes the acoustic transmitter to provide the acoustic signal. The timing circuitry determines a time of flight of the acoustic signal from the acoustic transmitter to the acoustic receiver. The speed of sound determination circuity determines, based on the time of flight and the distance, a speed of sound through air in the stagnation chamber. The communication circuitry outputs the speed of sound.

The acoustic air data sensor of the preceding paragraph can optionally include, additionally and/or alternatively, any one or more of the following features, configurations and/or additional components:

The acoustic air data sensor can further include temperature determination circuitry configured to determine, based on the speed of sound through the air in the stagnation chamber, a temperature of the air in the stagnation chamber. The communication circuitry can be further configured to output the temperature of the air in the stagnation chamber.

The temperature determination circuity can be configured to determine the temperature of the air in the stagnation chamber as proportional to a square of the determined speed of sound through the air in the stagnation chamber.

The acoustic air data sensor can further include a humidity sensor located in the stagnation chamber to sense a relative humidity of the air in the stagnation chamber. The temperature determination circuitry can be configured to determine the temperature of the air in the stagnation chamber based on the speed of sound through the air in the stagnation chamber and the relative humidity of the air in the stagnation chamber.

The stagnation chamber can be pneumatically connected to the exterior of the aircraft via an inlet and an outlet.

One or more of the inlet and the outlet can include a flow restrictor.

The flow restrictor can include a porous flow restrictor.

The stagnation chamber can be located within an interior of the aircraft.

The speed determination circuitry can be configured to determine the speed of sound through the air in the stagnation chamber by dividing the distance between the acoustic receiver and the acoustic transmitter by the time of flight of the acoustic signal from the acoustic transmitter to the acoustic receiver.

An air data system for an aircraft includes an acoustic air data sensor, an air data sensor, and an air data computer. The acoustic air data sensor includes an acoustic transmitter, an acoustic receiver, an acoustic signal generator, timing circuitry, speed of sound determination circuity, and communication circuitry. The acoustic transmitter is located to transmit an acoustic signal through an airflow stagnation chamber that is pneumatically connected to an exterior of the aircraft and configured to receive and stagnate airflow from the exterior of the aircraft. The acoustic receiver is positioned at a distance from the acoustic transmitter to receive the acoustic signal transmitted by the acoustic transmitter through the airflow stagnation chamber. The acoustic signal generator causes the acoustic transmitter to provide the acoustic signal. The timing circuitry determines a time of flight of the acoustic signal from the acoustic transmitter to the acoustic receiver. The speed of sound determination circuitry determines, based on the time of flight and the distance, a speed of sound through air in the stagnation chamber. The communication circuitry outputs the speed of sound. The air data sensor is mounted to the exterior of the aircraft and produces air data measurements. The air data computer is configured to receive the speed of sound from the acoustic air data sensor, receive the air data measurements from the air data sensor, and determine one or more air data output parameters using the received speed of sound from the acoustic air data sensor and the received air data measurements from the air data sensor.

The air data system of the preceding paragraph can optionally include, additionally and/or alternatively, any one or more of the following features, configurations and/or additional components:

The air data sensor mounted to the exterior of the aircraft can be an acoustic anemometer. The air data measurements received from the air data sensor can include acoustic anemometer measurements. The air data computer can be configured to determine the one or more air data output parameters using the received speed of sound from the acoustic air data sensor and the received acoustic anemometer measurements received from the acoustic anemometer.

The acoustic anemometer measurements can include anemometer time of flight data representing a time of flight between an acoustic transmitter of the acoustic anemometer and an acoustic receiver of the acoustic anemometer.

The air data computer can be configured to determine the one or more air data parameters by at least being configured to determine an angle of attack of the aircraft based on the anemometer time of flight data received from the acoustic anemometer and the speed of sound received from the acoustic air data sensor.

The acoustic air data sensor can further include temperature determination circuitry configured to determine, based on the determined speed of sound through the air in the stagnation chamber, a temperature of the air in the stagnation chamber.

The temperature determination circuity can be configured to determine the temperature of the air in the stagnation chamber as proportional to a square of the speed of sound through the air in the stagnation chamber.

The stagnation chamber of the acoustic air data sensor can be pneumatically connected to the exterior of the aircraft via an inlet and an outlet.

One or more of the inlet and the outlet can include a flow restrictor.

The flow restrictor can include a porous flow restrictor.

The stagnation chamber of the acoustic air data sensor can be located within an interior of the aircraft.

The air data computer can be configured to output the one or more air data parameters to one or more consuming systems for operational control of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An acoustic air data sensor for an aircraft, the acoustic air data sensor comprising:
  an acoustic transmitter located to transmit an acoustic signal through an airflow stagnation chamber that is pneumatically connected to an exterior of the aircraft and configured to receive and stagnate airflow from the exterior of the aircraft, each of an inlet and an outlet of the airflow stagnation chamber having a maximum width that is less than a maximum width of the airflow stagnation chamber;
  an acoustic receiver positioned at a distance from the acoustic transmitter to receive the acoustic signal transmitted by the acoustic transmitter through the airflow stagnation chamber, wherein each of the acoustic receiver and the acoustic transmitter are located in the airflow stagnation chamber;
  an acoustic signal generator that causes the acoustic transmitter to provide the acoustic signal;
  timing circuitry that determines a time of flight of the acoustic signal from the acoustic transmitter to the acoustic receiver;
  speed of sound determination circuity that determines, based on the time of flight and the distance, a speed of sound through air in the stagnation chamber; and
  communication circuitry that outputs the speed of sound.

2. The acoustic air data sensor of claim 1, further comprising:
  temperature determination circuitry configured to determine, based on the speed of sound through the air in the stagnation chamber, a temperature of the air in the stagnation chamber;
  wherein the communication circuitry is further configured to output the temperature of the air in the stagnation chamber.

3. The acoustic air data sensor of claim 2,
  wherein the temperature determination circuity is configured to determine the temperature of the air in the stagnation chamber as proportional to a square of the determined speed of sound through the air in the stagnation chamber.

4. The acoustic air data sensor of claim 2, further comprising:
  a humidity sensor located in the stagnation chamber to sense a relative humidity of the air in the stagnation chamber,
  wherein the temperature determination circuitry is configured to determine the temperature of the air in the stagnation chamber based on the speed of sound through the air in the stagnation chamber and the relative humidity of the air in the stagnation chamber.

5. The acoustic air data sensor of claim 1,
  wherein the stagnation chamber is pneumatically connected to the exterior of the aircraft via the inlet and the outlet.

6. The acoustic air data sensor of claim 4,
  wherein one or more of the inlet and the outlet include a flow restrictor.

7. The acoustic air data sensor of claim 5,
  wherein the flow restrictor comprises a porous flow restrictor.

8. The acoustic air data sensor of claim 1,
wherein the stagnation chamber is located within an interior of the aircraft.

9. The acoustic air data sensor of claim 1,
wherein the speed determination circuitry is configured to determine the speed of sound through the air in the stagnation chamber by dividing the distance between the acoustic receiver and the acoustic transmitter by the time of flight of the acoustic signal from the acoustic transmitter to the acoustic receiver.

10. An air data system for an aircraft, the air data system comprising:
an acoustic air data sensor comprising:
an acoustic transmitter located to transmit an acoustic signal through an airflow stagnation chamber that is pneumatically connected to an exterior of the aircraft and configured to receive and stagnate airflow from the exterior of the aircraft, each of an inlet and an outlet of the airflow stagnation chamber having a maximum width that is less than a maximum width of the airflow stagnation chamber;
an acoustic receiver positioned at a distance from the acoustic transmitter to receive the acoustic signal transmitted by the acoustic transmitter through the airflow stagnation chamber, wherein each of the acoustic transmitter and the acoustic receiver are located in the airflow stagnation chamber;
an acoustic signal generator that causes the acoustic transmitter to provide the acoustic signal;
timing circuitry that determines a time of flight of the acoustic signal from the acoustic transmitter to the acoustic receiver;
speed of sound determination circuity that determines, based on the time of flight and the distance, a speed of sound through air in the stagnation chamber; and
communication circuitry that outputs the speed of sound;
an air data sensor mounted to the exterior of the aircraft that produces air data measurements; and
an air data computer configured to:
receive the speed of sound from the acoustic air data sensor;
receive the air data measurements from the air data sensor; and
determine one or more air data output parameters using the received speed of sound from the acoustic air data sensor and the received air data measurements from the air data sensor.

11. The air data system of claim 10,
wherein the air data sensor mounted to the exterior of the aircraft is an acoustic anemometer;
wherein the air data measurements received from the air data sensor comprise acoustic anemometer measurements; and
wherein the air data computer is configured to determine the one or more air data output parameters using the received speed of sound from the acoustic air data sensor and the received acoustic anemometer measurements received from the acoustic anemometer.

12. The air data system of claim 10,
wherein the acoustic anemometer measurements comprise anemometer time of flight data representing a time of flight between an acoustic transmitter of the acoustic anemometer and an acoustic receiver of the acoustic anemometer.

13. The air data system of claim 12,
wherein the air data computer is configured to determine the one or more air data parameters by at least being configured to determine an angle of attack of the aircraft based on the anemometer time of flight data received from the acoustic anemometer and the speed of sound received from the acoustic air data sensor.

14. The air data system of claim 10,
wherein the acoustic air data sensor further comprises temperature determination circuitry configured to determine, based on the determined speed of sound through the air in the stagnation chamber, a temperature of the air in the stagnation chamber.

15. The air data system of claim 14,
wherein the temperature determination circuity is configured to determine the temperature of the air in the stagnation chamber as proportional to a square of the speed of sound through the air in the stagnation chamber.

16. The air data system of claim 10,
wherein the stagnation chamber of the acoustic air data sensor is pneumatically connected to the exterior of the aircraft via the inlet and the outlet.

17. The air data system of claim 16,
wherein one or more of the inlet and the outlet include a flow restrictor.

18. The air data system of claim 17,
wherein the flow restrictor comprises a porous flow restrictor.

19. The air data system of claim 10,
wherein the stagnation chamber of the acoustic air data sensor is located within an interior of the aircraft.

20. The air data system of claim 10,
wherein the air data computer is configured to output the one or more air data parameters to one or more consuming systems for operational control of the aircraft.

* * * * *